(12) United States Patent
Shimizu

(10) Patent No.: US 8,724,495 B2
(45) Date of Patent: May 13, 2014

(54) RELAY, METHOD OF RELAYING, AND WIRELESS COMMUNICATION SYSTEM

(75) Inventor: Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 13/301,525

(22) Filed: Nov. 21, 2011

(65) Prior Publication Data

US 2012/0213101 A1 Aug. 23, 2012

(30) Foreign Application Priority Data

Feb. 22, 2011 (JP) ................................. 2011-036452

(51) Int. Cl.
*H04J 3/16* (2006.01)

(52) U.S. Cl.
USPC ........... 370/252; 370/465; 370/467; 370/468; 370/469

(58) Field of Classification Search
USPC ........................................................ 370/252
See application file for complete search history.

(56) References Cited

U.S. PATENT DOCUMENTS

| | | | |
|---|---|---|---|
| 7,406,060 B2 * | 7/2008 | Periyalwar et al. | 370/328 |
| 7,746,815 B2 * | 6/2010 | Can et al. | 370/315 |
| 7,944,871 B2 | 5/2011 | Imamura et al. | |
| 8,050,619 B2 * | 11/2011 | Horiuchi et al. | 455/7 |
| 8,081,721 B2 * | 12/2011 | Osseiran et al. | 375/347 |
| 8,218,510 B2 * | 7/2012 | Kim et al. | 370/337 |
| 2008/0219222 A1 | 9/2008 | Lo et al. | |
| 2009/0201900 A1 | 8/2009 | Suga | |
| 2010/0035541 A1 * | 2/2010 | Kim et al. | 455/9 |
| 2010/0330902 A1 | 12/2010 | Fujita | |
| 2011/0092154 A1 * | 4/2011 | Horiuchi et al. | 455/7 |
| 2011/0176585 A1 * | 7/2011 | Seo et al. | 375/211 |
| 2011/0273999 A1 * | 11/2011 | Nagaraja | 370/252 |
| 2011/0317619 A1 * | 12/2011 | Lim et al. | 370/315 |
| 2012/0020279 A1 * | 1/2012 | Kim et al. | 370/315 |
| 2012/0250545 A1 * | 10/2012 | Papadogiannis et al. | 370/252 |
| 2012/0300666 A1 * | 11/2012 | Jang et al. | 370/252 |
| 2013/0005239 A1 * | 1/2013 | Almgren et al. | 455/7 |
| 2013/0039201 A1 * | 2/2013 | Kwon et al. | 370/252 |

FOREIGN PATENT DOCUMENTS

| | | |
|---|---|---|
| JP | 2006-352491 | 12/2006 |
| JP | 2010-521095 | 6/2010 |
| WO | WO 2006/118125 A1 | 11/2006 |
| WO | WO 2008/047429 A1 | 4/2008 |
| WO | WO 2009/118780 A1 | 10/2009 |

OTHER PUBLICATIONS

Horiuchi, Wireless Communication Device, Dec. 12, 2009, WO 2009/153941.*
Japanese Office Action mailed Feb. 18, 2014 for corresponding Japanese Application No. 2011-036452, with English-language translation.

* cited by examiner

*Primary Examiner* — Ian N Moore
*Assistant Examiner* — Lakeram Jangbahadur
(74) *Attorney, Agent, or Firm* — Fujitsu Patent Center

(57) ABSTRACT

A relay device that relays a wireless signal between a transmission device and a reception device, includes: a receiver that receives the wireless signal from the transmission device; a transmitter that transmits, to the reception device, the received wireless signal subjected to processing via a first protocol that amplifies the received wireless signal or a second protocol that decodes and re-encodes data contained in the received wireless signal; and a controller that switches between the first protocol and the second protocol using an evaluating index including a first evaluating value related to transmission environment between the transmission device and the relay device and a second evaluating value related to transmission environment between the relay device and the reception device.

12 Claims, 18 Drawing Sheets

FIG. 15

| DATA TYPE | A |
|---|---|
| VOICE COMMUNICATION | 0 |
| STREAMING | 0.2 |
| DATA DOWNLOAD | 0.5 |

RELAY, METHOD OF RELAYING, AND WIRELESS COMMUNICATION SYSTEM

CROSS-REFERENCE TO RELATED APPLICATION

This application is based upon and claims the benefit of priority of the prior Japanese Application No. 2011-036452 filed on Feb. 22, 2011 in Japan, the entire contents of which are hereby incorporated by reference.

FIELD

The embodiments discussed herein are related to a relay device, a method for relaying, and a wireless communication system.

BACKGROUND

In recent wireless communication, demands for expanding the service area and increasing a communication speed have arisen.

For the above, with the intention of eliminating blind spots and equalizing the throughput in a service area, multi-hop communication is frequently adopted in which a relay relays wireless signals.

A relay adopts relaying protocols, such as Amplify-and-Forward (AF) protocol and Decode-and-Forward (DF) protocol. The AF protocol amplifies a wireless signal that the relay receives and transmits the amplified signal. The DF protocol demodulates and decodes a wireless signal that the relay receives, re-encodes and re-modulates the processed signal, and transmits the signal.

The following Patent Literature 1 proposes relaying via the AF protocol and the DF protocol for optimization of downlink scheduling between a base station and a mobile station.
[Patent Literature 1] Japanese National Publication of International Patent Application No. 2010-521095

SUMMARY (1) According to an aspect of the embodiment, the relay device of one aspect that relays a wireless signal between a transmission device and a reception device includes: a receiver that receives the wireless signal from the transmission device; a transmitter that transmits, to the reception device, the received wireless signal subjected to processing via a first protocol that amplifies the received wireless signal or a second protocol that decodes and re-encodes data contained in the received wireless signal; and a controller that switches between the first protocol and the second protocol using an evaluating index including a first evaluating value related to first transmission environment between the transmission device and the relay device and a second evaluating value related to second transmission environment between the relay device and the reception device.

(2) According to an aspect of the embodiment, the method of one aspect for relaying a wireless signal between a transmission device and a reception device via a relay device includes: switching between a first protocol that amplifies the wireless signal or a second protocol that decodes and re-encodes data contained in the wireless signal to the reception device using an evaluating index including a first evaluating value related to first transmission environment between the transmission device and the relay device and a second evaluating value related to second transmission environment between the relay device and the reception device; and at the relay device, transmitting the wireless signal, which is received from the transmission device and which is subjected to processing via a protocol determined in the switching, to the reception device.

(3) According to an aspect of the embodiment, the (wireless) communication system including a transmission device that transmits a wireless signal, a reception device that receives the wireless signal, and a relay device that relays the wireless signal transmitted and received between the transmission device and the reception device, the relay device includes: a receiver that receives the wireless signal from the transmission device; a transmitter that transmits, to the reception device, the received wireless signal subjected to processing via a first protocol that amplifies the received wireless signal or a second protocol that decodes and re-encodes data contained in the received wireless signal; and a controller that switches between the first protocol and the second protocol using an evaluating index including a first evaluating value related to first transmission environment between the transmission device and the relay device and a second evaluating value related to second transmission environment between the relay device and the reception device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 15 is a diagram illustrating an example of a table representing association of a data type with a constant;

DESCRIPTION OF EMBODIMENTS

Due to movement of a mobile station and influence caused by interference from other base stations, the transmission environment surrounding a base station, a relay, and a mobile station changes every moment. A new building near the base station, the relay, or the mobile station may largely change the transmission environment. For this reason, the relaying method considered to be optimum when the wireless communication starts the service may not be always optimum.

If an allowable amount of delay is different with Quality of Service (QoS) of a wireless signal, an optimum relaying protocol may vary; for example, an AF protocol, which is lower latency than a DE protocol, may be the optimum or a DF protocol, which can more flexibly select a channel than an AF protocol, may be the optimum.

However, the technique of the above Patent Literature 1 do not switch between the AF protocol and the DF protocol in accordance with the transmission environment thereof.

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

Figure 1:
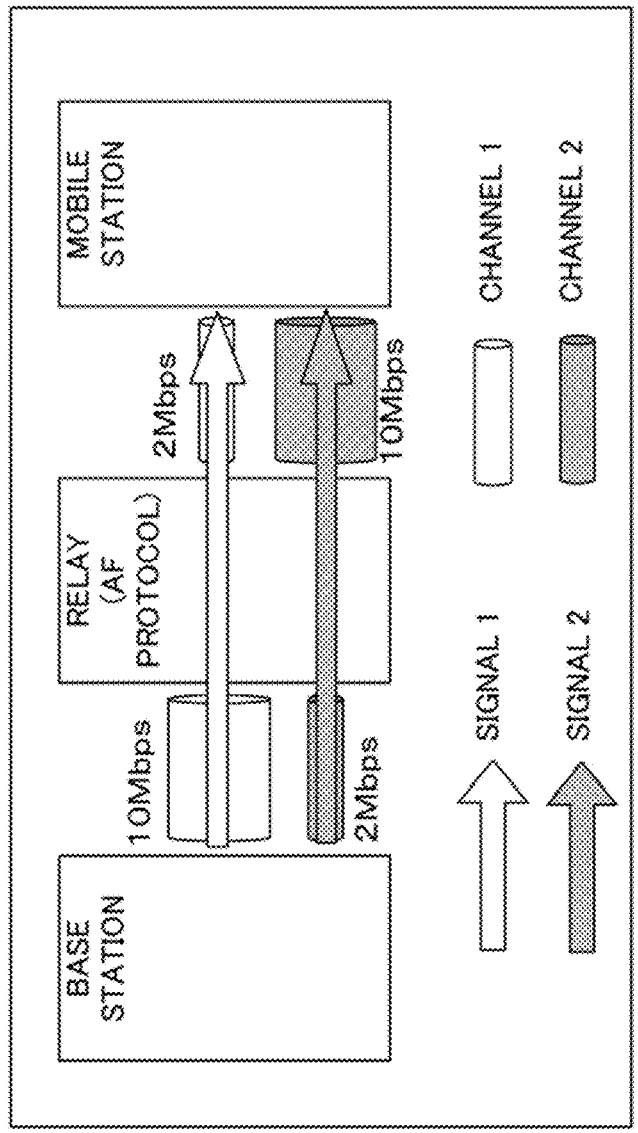
FIG. 1 is a diagram illustrating an example of the configuration of a wireless communication system having a relay that relays wireless signals via AF protocol.

(1) First Embodiment:

(1.1) Amplify-and-Forward (AF) Protocol and Decode-and-Forward (DF) Protocol:

FIG. 1 is a diagram illustrating an example of the configuration of a wireless communication system that relays a wireless signal via an AF protocol serving as a first protocol that amplifies the wireless signal.

In the example of FIG. 1, the signal 1 (see the white arrow in the drawing) and the signal 2 (see the hatched arrow in the drawing) transmitted from the base station are transmitted via the relay to the mobile station. The channel 1 and the channel 2 represented by cylinders in the drawing may have, for example, different frequencies. The thickness of each channel in the drawing is proportional to the transmission capacity of the channel.

Here, focusing on the wireless propagation channel between the base station and the relay, the example illustrated in FIG. 1 is capable of transmitting a signal at the rate of 10 Mbps through the channel 1 while transmitting a signal at the rate of 2 Mbps through the channel 2. Focusing on the propagation channel between the relay and the mobile station, the example illustrated in FIG. 1 is capable of transmitting a signal at the rate of 10 Mbps through the channel 2 while transmitting a signal at the rate of 2 Mbps through the channel 1.

The relay adopting an AF protocol amplifies a wireless signal received by the relay without additional processing and transmits the amplified wireless signal to the mobile station.

For the above, the signal 1, which the base station transmits through the channel 1, is subjected to relaying processing via the AF protocol in the relay and is then transmitted through the channel 1 to the mobile station. Similarly, the signal 2, which the base station transmits through the channel 2, is subjected to relaying processing via the AF protocol in the relay and is then transmitted through the channel 2 to the mobile station.

Accordingly, in the example of FIG. 1, the section of the poor transmission characteristic of the channel 1, that is, the wireless propagation channel between the relay and the mobile station, causes a bottle neck in transmitting the signal 1, which consequently has a maximum transmission rate of 2 Mbps. Similarly, the section of the poor transmission characteristic of the channel 2, that is, the wireless propagation channel between the base station and the relay, causes a bottle neck in transmitting the signal 2, which consequently has the same maximum transmission rate of 2 Mbps.

Figure 2:
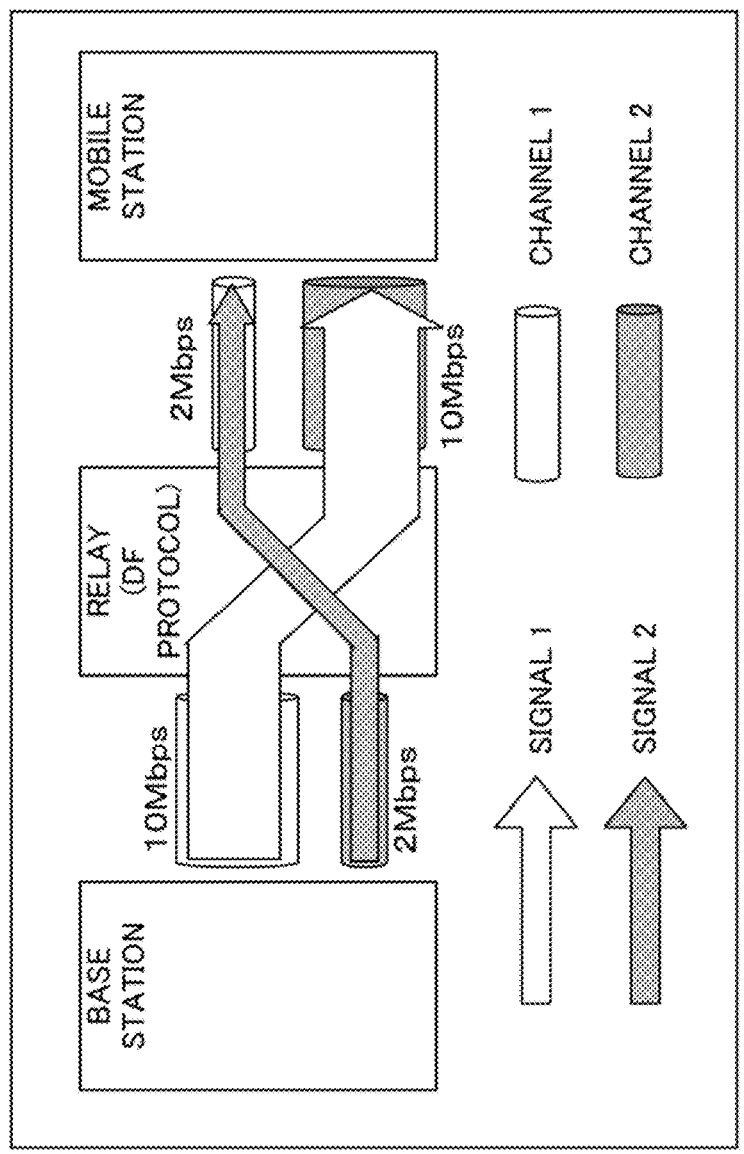
FIG. 2 is a diagram illustrating an example of the configuration of a wireless communication system having a relay that relays wireless signals via DF protocol.

FIG. 2 is a diagram illustrating an example of the configuration of a wireless communication system that relays a wireless signal via a DF protocol serving as a second method that decodes and re-encodes data contained in the wires signal. Also in FIG. 2, the white arrow represents the signal 1 and the hatched arrow represents the signal 2 likewise the FIG. 1. The thickness of each cylinder in the drawing representing a channel corresponds to the transmission capacity of the channel.

As illustrated in FIG. 2, when the relay adopts the DF protocol to transmission of a wireless signal, the relay demodulates and decodes the signal as well as the base station so that the channel through which the wireless signal is to be transmitted can be selected for a section between the base station and the relay and a section between the relay and the mobile station.

For the above, if both the base station and the relay select appropriate channels so that, for example, the signal 1 is transmitted through the channel 1 between the base station and the relay and through the channel 2 between the relay and the mobile station, the signal 1 can be transmitted from the base station to the mobile station at the rate of 10 Mbps. Similarly, the signal 2 can be transmitted from the base station to the mobile station at the rate of 2 Mbps when the signal 2 is transmitted through the channel 2 between the base station and the relay and through the channel 1 between the relay and the mobile station. Consequently, the transmission rate of the signal 1 can be enhanced.

However, in relaying via the DF protocol, the relay need to carry out more complex signal processing than the relaying via the AF protocol, and consequently have a larger delay than a delay caused by the relaying via the AF protocol.

Figure 3:
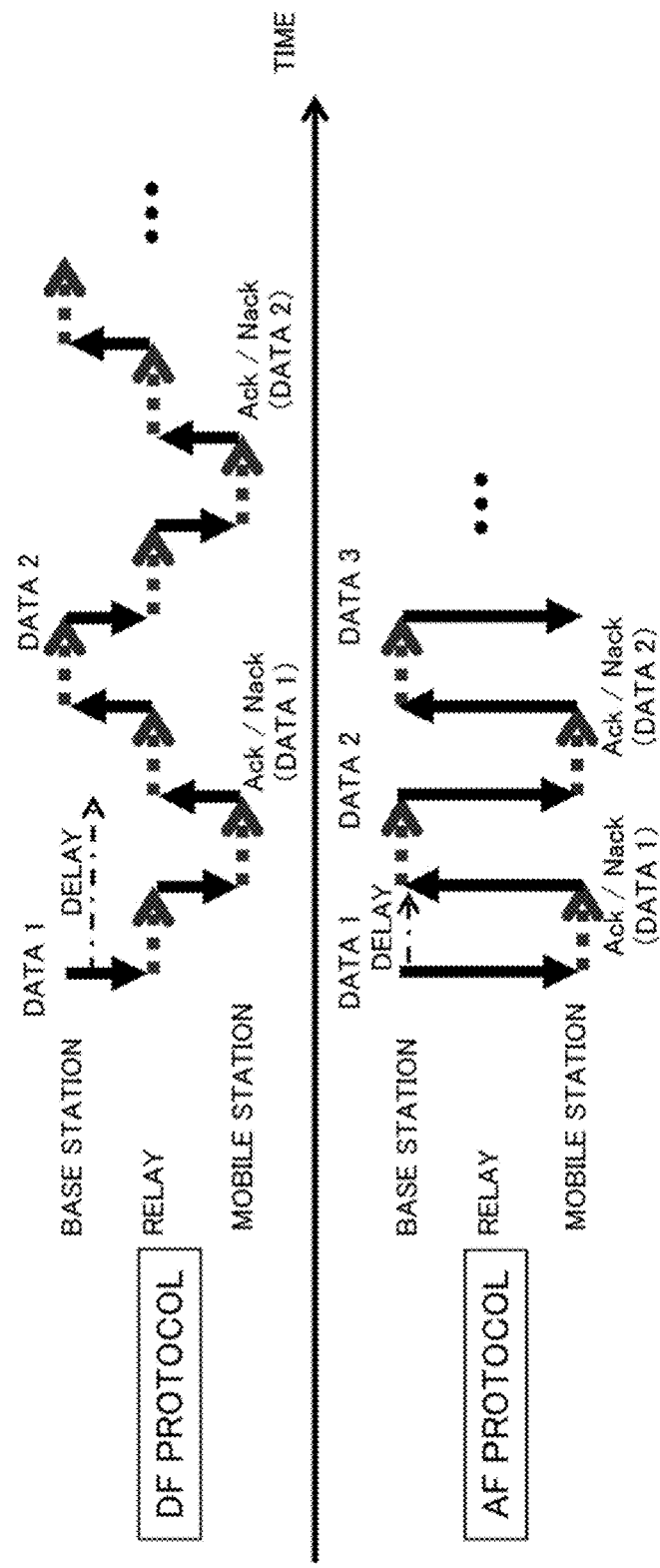
FIG. 3 is a diagram illustrating an example of a time sequence of data transmission.

FIG. 3 is a diagram illustrating an example of a time sequence of data transmission. In the drawing, a solid arrow represents the direction of a flow of data (signal) being transmitted, and a broken arrow represents a delay caused by signal processing.

As illustrated in FIG. 3, if the relay adopts the DF protocol to relaying, signal relaying processing in the relay causes a delay (relaying delay).

For example, the DF protocol causes a delay twice in amount the delay caused by the AF transmission during a series of processing from transmitting data from the base station to transmission of a responding ACK/NACK signal concerning the transmitted data from the mobile station (see the dashed-dotted arrow in FIG. 3). A twice amount of delay means that data to be transmitted in a unit time halves, in other words, the transmission rate halves.

As the above, when the AF protocol is adopted, the relay causes a smaller amount of delay in transmitting a wireless signal, but does not select a channel in the relay, which may sometimes hinder enhancement in transmission rate.

Conversely, when the DF protocol is adopted, the relay can select an appropriate channel to enhance the transmission rate, but has a larger amount of delay (relaying delay) in relaying a wireless signal.

As a solution to the above, the embodiment and modifications to be detailed below flexibly switches between, for example, the AF protocol and DF protocol in accordance with the transmission environment to enhance the transmission rate.

Figure 4:
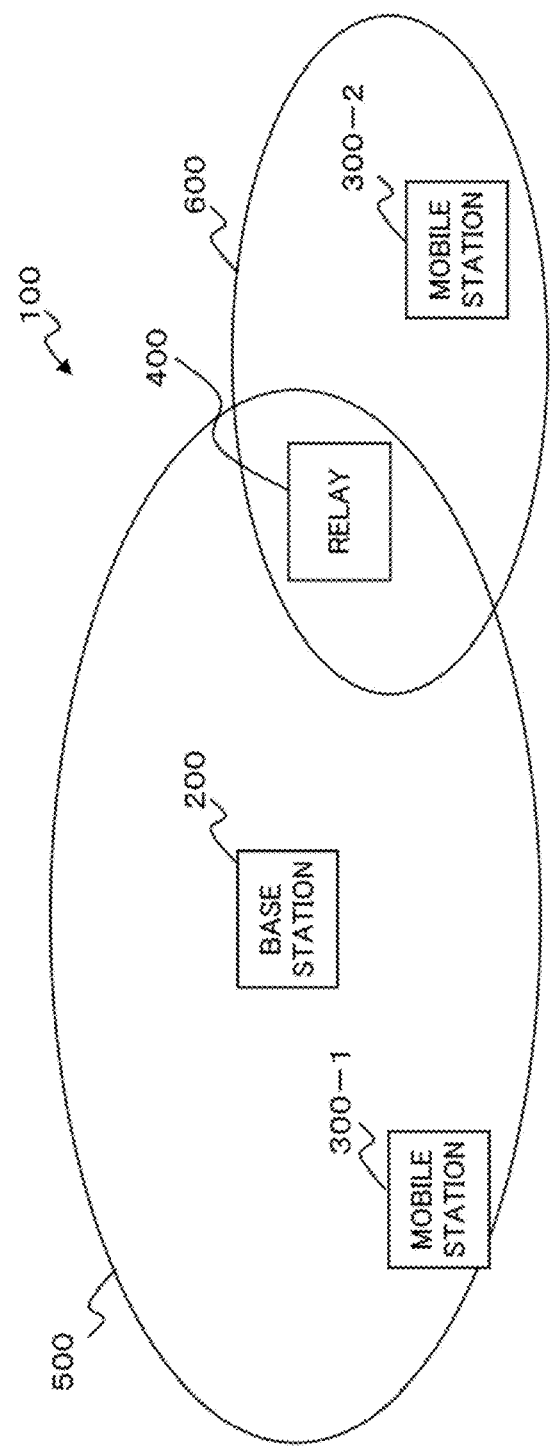
FIG. 4 is a diagram illustrating an example of the configuration of a wireless communication system according to a first embodiment.

(1.2) Wireless Transmission System:

FIG. 4 is a diagram illustrating an example of the configuration of a wireless communication system according to a first embodiment.

A wireless communication system 100 of FIG. 4 exemplarily includes a base station 200, mobile stations 300-1 and 300-2, and a relay 400.

If there is no need to discriminate the mobile stations 300-1 and 300-2 from each other, the mobile stations 300-1 and 300-2 are each represented by mobile station 300 in the following description. The number of base stations 200, the number of mobile stations 300 and the number of relays 400 should by no means be limited to those in FIG. 4. For example, another non-illustrated relay may relay a wireless signal transmitted from the base station 200 to another non-illustrated mobile station. One or more relays between the base station 200 and the relay 400 or between the relay 400 and the mobile station 300 may be disposed to multistage-relay a wireless signal.

The following description assumes that the base station 200 and mobile station 300 function as examples of a transmission device and a reception device, respectively, and concerns downlink transmission of a wireless signal from the base station 200 to the mobile station 300. However, it should be noted that this embodiment is not limited to the description. For example, this embodiment may be applied to uplink transmission from the mobile station mobile station 300 to the base station 200, that is, the mobile station 300 and the base station 200 function as examples of a transmission device and a reception device, respectively. Needless to say, if the wireless transmission system is capable of performing ad-hoc communication, the base station 200 and the mobile station 300 may also function as examples of a relay.

Here, the base station 200 in FIG. 4 can conduct wireless communication directly with the mobile station 300-1 located within a cover area 500 of the base station 200.

In the meantime, the base station 200 does not conduct wireless communication directly with the mobile station 300-2 located out of the cover area 500 of the base station 200, and instead conducts wireless communication with the mobile station 300-2 via the relay 400.

The relay 400 is located inside the cover area 500 of the base station 200 and can relay a wireless signal from the base station 200 to the mobile station 300-2. The relay 400 receives a wireless signal that the base station 200 transmits, performs predetermined relaying processing on the received wireless signal, and re-transmits the wireless signal mobile station 300-2 located inside the cover area 600 of the relay 400.

The relay 400 may be fixed to a predetermined position or may be movable. If the relay 400 is movable, the cover area 600 moves in accordance with movement of the relay 400.

Figure 5:
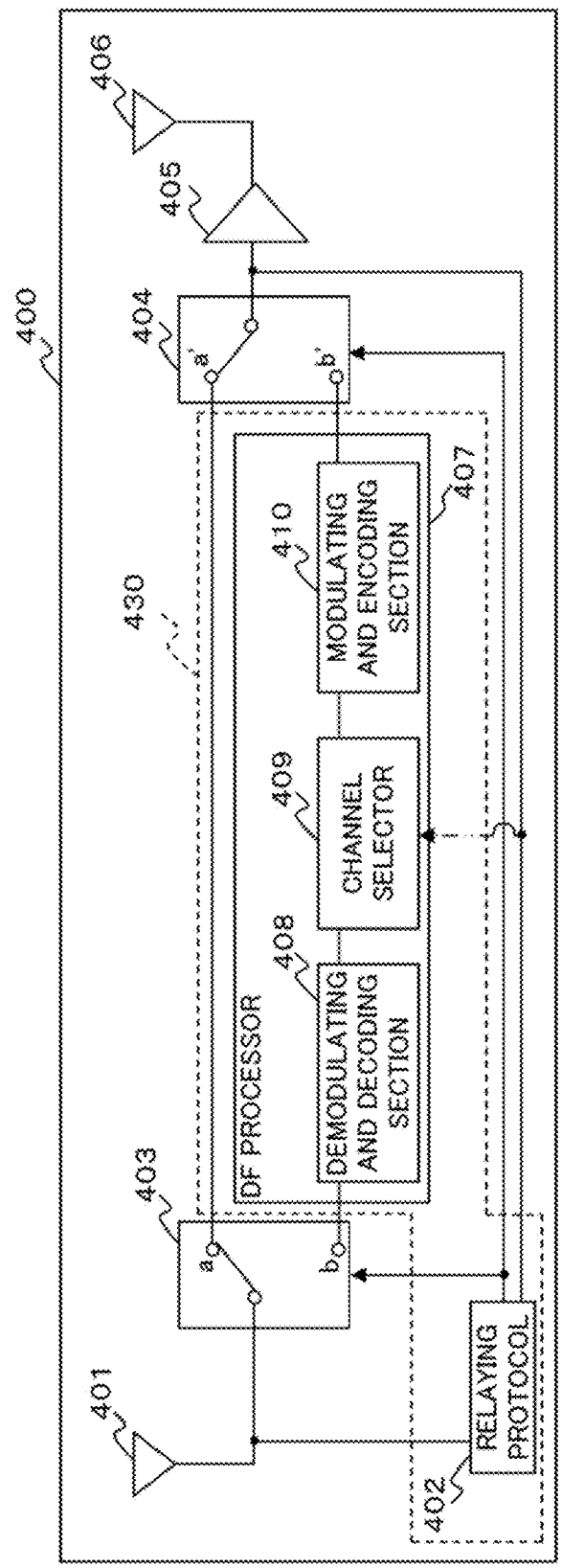
FIG. 5 is a diagram illustrating an example of the configuration of a relay of FIG. 4.

(1.3) Relay 400:

FIG. 5 is a diagram illustrating an example of the configuration of the relay 400.

The relay 400 of FIG. 5 exemplarily includes a receiving antenna 401, switches 403 and 404, an amplifier 405, a transmitting antenna 406, and a digital circuit 430.

The digital circuit 430 carries out various signal processes related to relaying a wireless signal. The various signal processes include, for example, selection of a relaying protocol, and a relaying process via the DF protocol.

For this purpose, the digital circuit 430 exemplarily includes a relaying protocol selector 402 and a DF processor 407.

The digital circuit 430 is in the form of, for example, a Field Programmable Gate Array (FPGA), an Application Specific Integrated Circuit (ASIC), or a Digital Signal Processor (DSP). The relaying protocol selector 402 and the DF processor 407 may each be in the form of an independent DSI, FPGA, or the like.

The receiving antenna 401 receives wireless signals including wireless signals transmitted from, for example, the base station 200 and the mobile station 300. Namely, the receiving antenna 401 functions as an example of a receiver that receives a wireless signal from the base station 200, serving as an example of a transmission device.

The relaying protocol selector 402 extracts signals to be used for estimation and extraction of propagation channel information, such as a channel coefficient, from the wireless signal that the receiving antenna 401 receives, estimates and extracts the propagation channel information, such as a channel coefficient, using the extracted data, and selects a relaying protocol from the AF protocol and DF protocol on the basis of the propagation channel information. The signals to be used for estimation and extraction of propagation channel information includes, for example, a known signal such as a pilot signal that the base station 200 transmits, and a signal containing propagation channel information that the mobile station 300 transmits.

Then the relaying protocol selector 402 outputs information about the selected relaying protocol to the switches 403 and 404 that are to be detailed below.

The relaying protocol selector 402 can notify the propagation channel information and the selected relaying protocol described above to the base station 200 through the amplifier 405 and the transmitting antenna 406. This notification makes the base station 200 possible to select a proper channel for transmitting the wireless signal on the basis of various pieces of information notified from the relay 400, so that the transmission rate can be enhanced. The relaying protocol selector 402 will be detailed below with reference to FIG. 6.

The switches 403 and 404 switch a signal path in the relay 400 in accordance with the relaying protocol that the relaying protocol selector 402 selects, and thereby switch the relaying protocol.

Specifically for example, when the switches 403 and 404 are provided with information that the AF protocol is adopted, the switches 403 and 404 make an a-a' circuit active while when the switches 403 and 404 are provided with information that the DF protocol is adopted, the switches 403 and 404 make a b-b' circuit active.

For the above, the relaying protocol selector 402 and the switches 403 and 404 collectively function as an example of a controller that switches between the first protocol and the second protocol on the basis of a predetermined evaluating index including a first evaluating value related to transmission environment between the base station 200 serving as an example of the transmission device and the relay 400 and a second evaluating value related to transmission environment between the relay 400 and the mobile station 300 serving as an example of the reception device.

Next, description will now be made in relation to the DF processor 407.

The DF processor 407 carries out various processes related to the DF relaying protocol on a wireless signal that the receiving antenna 401 receives. The processes include demodulating and decoding, re-selecting a channel, and re-encoding and re-modulating.

For this purpose, the DF processor 407 exemplarily includes a demodulating and decoding section 408, a channel selector 409, and an encoding and modulating section 410.

The demodulating and decoding section 408 demodulates and decodes a wireless signal that the receiving antenna 401 receives. The signal after being subjected to demodulating and decoding is output to the channel selector 409.

The channel selector 409 selects a channel through which the wireless signal is to be retransmitted on the basis of the propagation channel information about a section from the relay 400 to the mobile station 300. The propagation channel information about the section from the relay 400 to the mobile station 300 may be obtained directly from the wireless signal from the mobile station 300 by the channel selector 409 or may be obtained from the result of the extraction by the relaying protocol selector 402.

The encoding and modulating section 410 re-encodes and re-modulates the signal output from the channel selector 409, and outputs the processed signal to the amplifier 405 through the switch 404.

The amplifier 405 amplifies the signal from the switch 404 and outputs the amplified signal to the transmitting antenna 406.

The transmitting antenna 406 transmits the signal amplified by the amplifier 405. The wireless signal output from the transmitting antenna 406 is transmitted to, for example, the mobile station 300.

The transmitting antenna 406 functions as an example of a transmitter that transmits, to the mobile station 300 serving as an example of a reception device, the received wireless signal subjected to processing via a first protocol that amplifies the received wireless signal or a second protocol that decodes and re-encodes data contained in the received wireless signal.

The receiving antenna 401 and the transmitting antenna 406 may be replaced by a single common antenna under the presence of an antenna duplexer.

Figure 6:
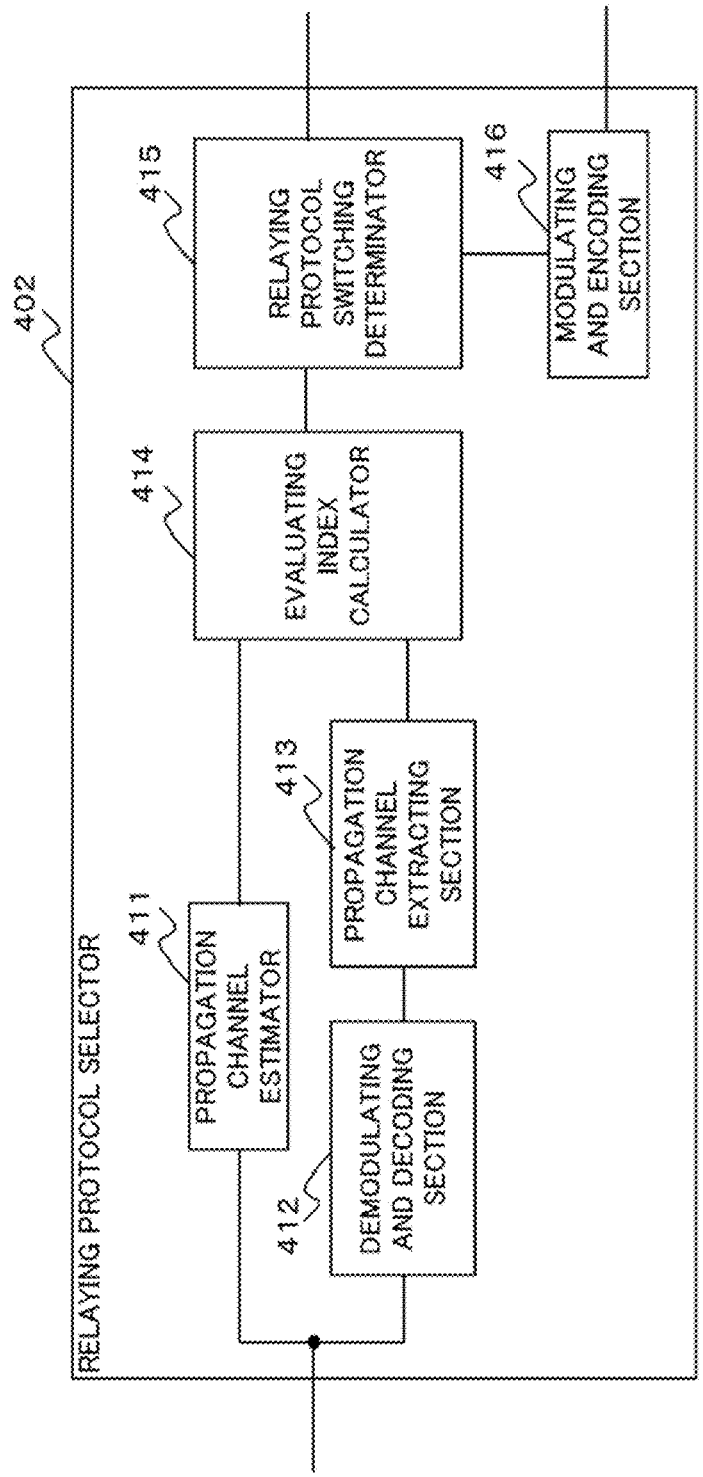
FIG. 6 is a diagram illustrating an example of the configuration of the relaying protocol selector.

Here, FIG. 6 illustrates an example of the configuration of the relaying protocol selector 402.

The relaying protocol selector 402 of FIG. 6 exemplarily includes a propagation channel estimator 411, a demodulating and decoding section 412, a propagation channel extracting section 413, an evaluating index calculator 414, a relaying protocol switching determinator 415, and an encoding and modulating section 416.

A signal input into the relaying protocol selector 402 is input into the propagation channel estimator 411 or the propagation channel extracting section 413 via demodulating and decoding section 412.

The propagation channel estimator 411 estimates the propagation channel information using a known signal such as a pilot signal that the base station 200 transmits.

Here, description will now be made in relation to a manner of estimating the propagation channel information.

The relationship of the following Formula (1) is established in which the term x represents a transmitted known signal; the term y represents a received signal; the term a represents a channel coefficient, and the term n represents a reception noise.

$$y = \alpha x + n \quad (1)$$

The channel coefficient $\alpha$ is estimated by dividing y by x in Formula (1). The influence caused by a noise can be reduced by averaging the result of the estimation using a number of symbols (terms).

The propagation channel estimator 411 estimates the propagation channel from the base station 200 to the relay 400 in the above manner. The propagation channel information estimated by the propagation channel estimator 411 is output to the channel selector 409 and used in the channel selector 409 for selecting a channel through which a wireless signal is to be transmitted. The propagation channel information may be transmitted to the base station 200 for selecting a channel through which a wireless signal is to be transmitted.

Propagation channel information from the relay 400 to the mobile station 300 is estimated in the mobile station 300 and is transmitted as feedback in the form of a wireless signal to the relay 400.

The demodulating and decoding section 412 demodulates and decodes the wireless signal that the mobile station 300 transmits as feedback to the relay 400 and the propagation channel extracting section 413 then extracts the propagation channel information from the signal processed by and output from the demodulating and decoding section 412.

On the basis of the propagation channel information obtained by the propagation channel estimator 411, the demodulating and decoding section 412, and the propagation channel extracting section 413, the evaluating index calculator 414 calculates evaluating values $C_{AF}$ and $C_{DF}$ that are to be used for switching a relaying protocol using the following Formulae (2) and (3). As described above, this example assumes downlink communication. For simplification, the propagation channel between the base station 200 and the relay 400 has two channels and that between the relay 400 and the mobile station 300 also has two channels.

$$C_{AF} = \text{Min}(C(\alpha_1), C(\beta_1)) + \text{Min}(C(\alpha_2), C(\beta_2)) \quad (2)$$

$$C_{DF} = \text{Min}(C(\alpha_1) + C(\alpha_2), C(\beta_1) + C(\beta_2)) \quad (3)$$

In the above Formulae, the terms $\alpha_1$ and $\alpha_2$ represent first and second channel coefficients of a propagation channel from the base station 200 to the relay 400; the terms $\beta_1$ and $\beta_2$ represent first and second channel coefficients of a propagation channel from the relay 400 to the mobile station 300; the term C( ) represents an evaluating function; and the term Min( ) represents a function that selects the minimum argument from a number of arguments.

As an example of the evaluating function, a channel capacity expressed by the following Formula (4) can be used.

$$C(\alpha) = \log(1 + |\alpha|^2 S/N) \quad (4)$$

In Formula (4), the term S represents a transmission signal power and the term N represents a received noise power.

Alternatively, amount of mutual information expressed by the following Formula (5) may be used as the above evaluating function.

$$C(\alpha) = \iint p(x,y) \times \log(p(y|x)) - p(y) \times \log(p(y)) dx dy \quad (5)$$

In Formula (5), the term p(x, y) represents a probability distribution of x and y; the term p (y|x) represents a conditional probability distribution of y given x; and the term p(y) represents a probability distribution of y.

On the basis of the evaluating values $C_{AF}$ and $C_{DF}$ calculated by the evaluating index calculator 414 and a predetermined constant A (0≤A<1), the relaying protocol switching determinator 415 determines whether the relaying protocol is to be switched. For example, when $C_{AF}>AC_{DF}$, the relaying protocol switching determinator 415 may select the AF protocol while, when $C_{AF} \leq AC_{DF}$, the relaying protocol switching determinator 415 may select the DF protocol.

Here, the constant A can be determined on the basis of an amount delay, for example, when the DF protocol is adopted. For example, if amount of delay when the DF protocol is adopted is k times (here, k is a real number larger than one) an amount of delay when the AF protocol is adopted, the constant A may be set to be 1/k. Considering practical superiority of the AF protocol to the DF protocol, such as a simpler circuit configuration and a smaller consumption power, the constant A may be set further smaller.

The encoding and modulating section 416 encodes and modulates the propagation channel information estimated by the propagation channel estimator 411, the propagation channel information extracted by the propagation channel extracting section 413, and information about the selected relaying protocol. Each wireless signal processed by the encoding and modulating section 416 is transmitted through the amplifier 405 and the transmitting antenna 406 to the base station 200.

The above configuration makes the relay 400 possible to determine the relaying protocol of a wireless signal on the basis of the propagation channel information between the base station 200 and the relay 400 and the propagation channel information between the relay 400 and the mobile station 300. Consequently, the relay 400 can adaptively switch the relaying protocol between the AF protocol and the DF protocol simply by switching the signal path in the relay 400, so that a preferable state of transmission can be maintained.

Figure 7:
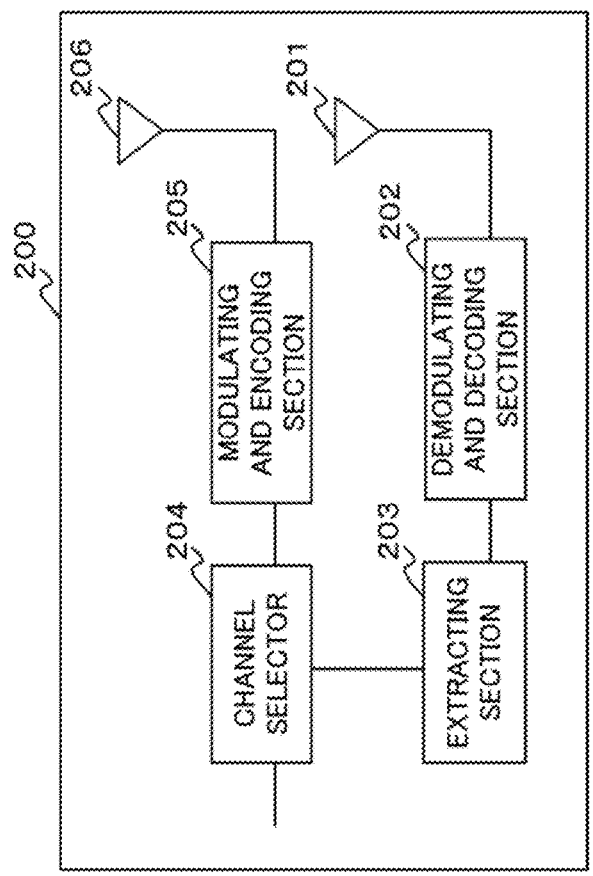
FIG. 7 is a diagram illustrating an example of the configuration of the base station of FIG. 4.

(1.4) Base Station 200:

FIG. 7 is a diagram illustrating an example of the configuration of the base station 200.

The base station 200 of FIG. 7 exemplarily includes a receiving antenna 201, a demodulating and decoding section 202, an extracting section 203, a channel selector 204, an encoding and modulating section 205, and a transmitting antenna 206.

The receiving antenna 201 receives wireless signals including wireless signals transmitted from, for example, the relay 400. A wireless signal that the relay 400 transmits may include propagation channel information of a section from the base station 200 to the relay 400, that of a section from the relay 400 to the mobile station 300, and information about the relaying protocol that the relaying protocol switching determinator 415 selects.

The demodulating and decoding section 202 demodulates and decodes the wireless signal that the receiving antenna 201 receives.

The extracting section 203 extracts propagation channel information of the section from the base station 200 to the relay 400, that of the section from the relay 400 to the mobile station 300, and information about the relaying protocol from the signal that the demodulating and decoding section 202 outputs.

If the relay 400 adopts the AF protocol, the extracting section 203 extracts information of the entire propagation channel from the base station 200 to the mobile station 300. On the other hand, if the relay 400 adopts the DF protocol, the extracting section 203 sufficiently extracts information of a propagation channel from the base station 200 to the relay 400.

On the basis of the various pieces of information obtained by the extracting section 203, the channel selector 204 selects a channel through which a wireless signal is to be transmitted.

Namely, if the relay 400 relays wireless signals via the AF protocol, the channel selector 204 selects the channel to be used, considering the propagation channel information of the entire propagation channel from the base station 200 to the mobile station 300. On the other hand, if the relay 400 relays wireless signals via the DF protocol, the channel selector 204 selects the channel to be used, considering the propagation channel information of a section from the base station 200 to the relay 400.

The encoding and modulating section 205 encodes and modulates data to be transmitted so that the wireless signal is transmitted through the channel that the channel selector 204 selects.

The transmitting antenna 206 transmits the wireless signal containing the data encoded and modulated by the encoding and modulating section 205. The signal that the transmitting antenna 206 transmits is received by, for example, the relay 400 or the mobile station 300. The receiving antenna 201 and the transmitting antenna 206 may be replaced by a single common antenna under the presence of an antenna duplexer.

The above configuration makes the base station 200 possible to properly select a channel to be used to transmit wireless signals on the basis of the propagation channel information of a section from the base station 200 to the relay 400, the propagation channel information of a section from the relay 400 to the mobile station 300, and information about the relaying protocol selected in the relay 400. Thereby, the base station 200 can select the optimum channel to transmit wireless signals in accordance with the relaying protocol that the relay 400 selects.

Figure 8:
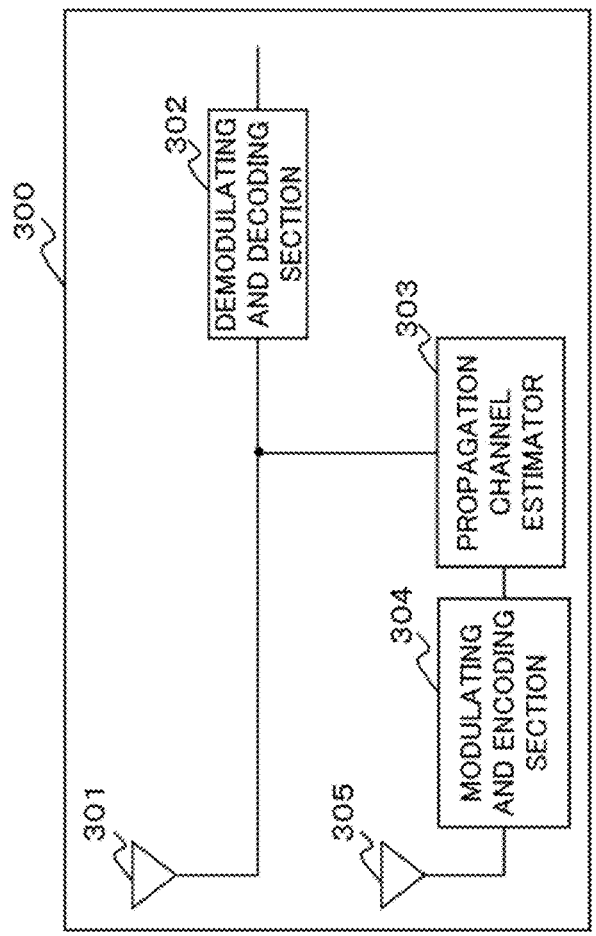
FIG. 8 is a diagram illustrating an example of the configuration of a mobile station of FIG. 4.

(1.5) Mobile Station 300:

FIG. 8 is a diagram illustrating an example of the configuration of the mobile station 300.

The mobile station 300 of FIG. 8 exemplarily includes a receiving antenna 301, a demodulating and decoding section 302, a propagation channel estimator 303, an encoding and modulating section 304, and a transmitting antenna 305.

The receiving antenna 301 receives wireless signals that the base station 200 or the relay 400 transmits.

The demodulating and decoding section 302 demodulates and decodes the wireless signal that the receiving antenna 301 receives.

The propagation channel estimator 303 estimates propagation channel information of a section from the relay 400 to the mobile station 300 using a known signal, such as a pilot signal that the relay 400 transmits, and has the same function as that of the propagation channel estimator 411 detailed above.

The encoding and modulating section 304 encodes and modulates a data signal containing the propagation channel information that the propagation channel estimator 303 obtains so that the propagation channel information is transmitted to the relay 400.

The transmitting antenna 305 transmits a wireless signal encoded and modulated in the encoding and modulating section 304. The signal that the transmitting antenna 305 transmits is received by the relay 400 or the base station 200. The receiving antenna 301 and the transmitting antenna 305 may be replaced by a single common antenna under the presence of an antenna duplexer.

The above configuration makes the mobile station 300 possible to receive a wireless signal that the relay 400 transmits. The mobile station 300 further estimates, in the propagation channel estimator 303, the propagation channel information of a section from the relay 400 to the mobile station 300 using a known signal such as a pilot signal that the relay 400 transmits, and transmits the propagation channel information as feedback to the relay 400 through the encoding and modulating section 304 and the transmitting antenna 305.

As described above, the first embodiment adaptively switches the AF protocol and the DF protocol on the basis of the propagation channel information, so that a preferable state of transmission can be maintained.

(2) First Modification:

In the first embodiment described above, the relay 400 makes determination on switching of a relaying protocol. Alternatively, the base station 200 may determine to switch a relaying protocol.

Figure 9:
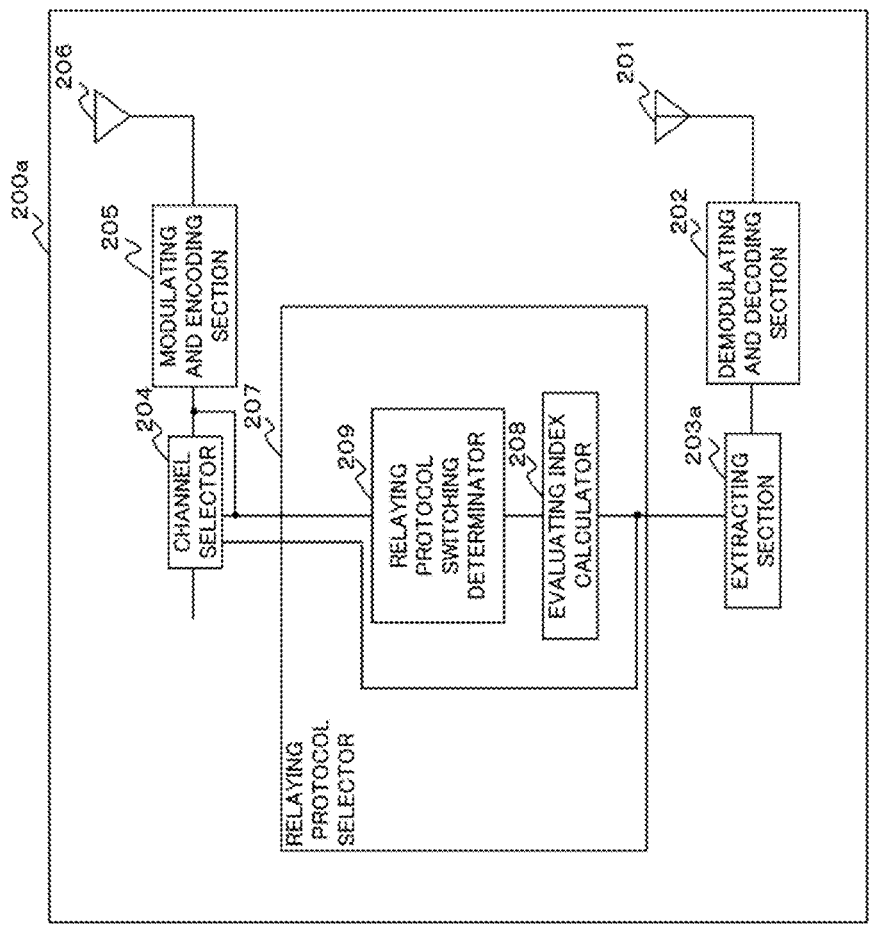
FIG. 9 is a diagram illustrating an example of the configuration of a base station according to a first modification.

FIG. 9 is a diagram illustrating an example of the configuration of a base station 200*a* according to the first modification.

The base station 200*a* of FIG. 9 exemplarily includes a receiving antenna 201, a demodulating and decoding section 202, an extracting section 203*a*, a channel selector 204, an encoding and modulating section 205, a transmitting antenna 206, and a relaying protocol selector 207. Parts and element in FIG. 9 having the same reference numbers as the above represents the same or similar functions, so repetitious description is omitted here.

The extracting section 203*a* extracts propagation channel information of a section from the base station 200*a* to the relay 400*a* and propagation channel information of a section from the relay 400*a* to the mobile station 300 from a signal that the demodulating and decoding section 202 outputs.

The relaying protocol selector 207 selects one of the AF protocol and DF protocol on the basis of the propagation channel information of a section from the base station 200*a* and the relay 400*a* to be detailed below and the propagation channel information of a section from the relay 400*a* to the mobile station 300 that are output from the extracting section 203*a*.

The relaying protocol selector 207 outputs information about the selected relaying protocol and the two pieces of the propagation channel information to the channel selector 204.

Furthermore, the information about the selected relaying protocol is transmitted to the relay 400*a* through the encoding and modulating section 205 and the transmitting antenna 206.

For this purpose, the relaying protocol selector 207 includes an evaluating index calculator 208 and a relaying protocol switching determinator 209.

On the basis of the propagation channel information of a section from the base station 200*a* and the relay 400*a* and the propagation channel information of a section from the relay 400*a* to the mobile station 300 that are output from the extracting section 203*a*, the evaluating index calculator 208 calculates evaluating values $C_{AF}$ and $C_{DF}$ that are to be used for switching a relaying protocol using the following Formulae (2) and (3). The calculated evaluating values $C_{AF}$ and $C_{DF}$ are output to the relaying protocol switching determinator 209.

On the basis of the evaluating values $C_{AF}$ and $C_{DF}$ calculated by the evaluating index calculator 208 and a predetermined constant A ($0 \leq A < 1$), the relaying protocol switching determinator 209 determines whether the relaying protocol is to be switched. For example, when $C_{AF} > AC_{DF}$, the relaying protocol switching determinator 209 selects the AF protocol while, when $C_{AF} \leq AC_{DF}$, the relaying protocol switching determinator 209 selects the DF protocol.

The information about the relaying protocol that the relaying protocol switching determinator 209 selects is output to the channel selector 204, and is also notified to the relay 400*a* through the encoding and modulating section 205 and the transmitting antenna 206. The relay 400*a* switches the relaying protocol according to the notified information.

The above configuration makes the base station 200*a* possible to determine whether the relaying protocol that the relay 400*a* is to adopt is to be switched on the basis of the propagation channel information between the base station 200*a* and the relay 400*a* and the propagation channel information between the relay 400*a* and the mobile station 300. The information about the switching is notified through the transmitting antenna 206 to the relay 400*a*.

Figure 10:
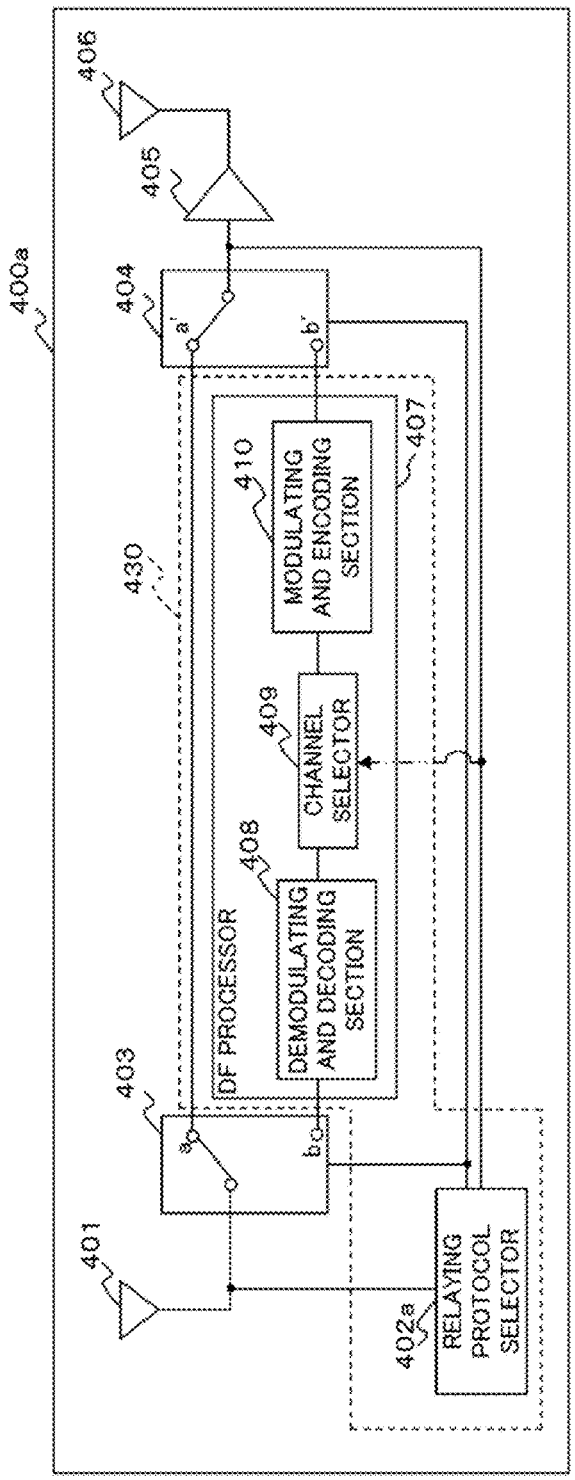
FIG. 10 is a diagram illustrating an example of the configuration of a relay according to the first modification.

FIG. 10 is a diagram illustrating an example of the configuration of the relay 400*a* according to the first modification.

The relay 400*a* of FIG. 10 exemplarily includes a receiving antenna 401, switches 403 and 404, an amplifier 405, a transmitting antenna 406, and a digital circuit 430.

The digital circuit 430 exemplarily includes a relaying protocol selector 402*a* and a DF processor 407, which exemplarily includes a demodulating and decoding section 408, a channel selector 409, and an encoding and modulating section 410.

The digital circuit 430 is in the form of, for example, an FPGA, an ASIC, or a DSP. The relaying protocol selector 402*a* and the DF processor 407 may each be in the form of an independent DSP, FPGA, or the like.

Parts and element in FIG. 10 having the same reference numbers as the above represents the same or similar functions, so repetitious description is omitted here.

The relaying protocol selector 402*a* of FIG. 10 extracts information about the relaying protocol that the relaying protocol switching determinator 209 in the base station 200*a* selects from the wireless signal transmitted from the base station 200*a*, and outputs the extracted information to the switches 403 and 404.

Figure 11:
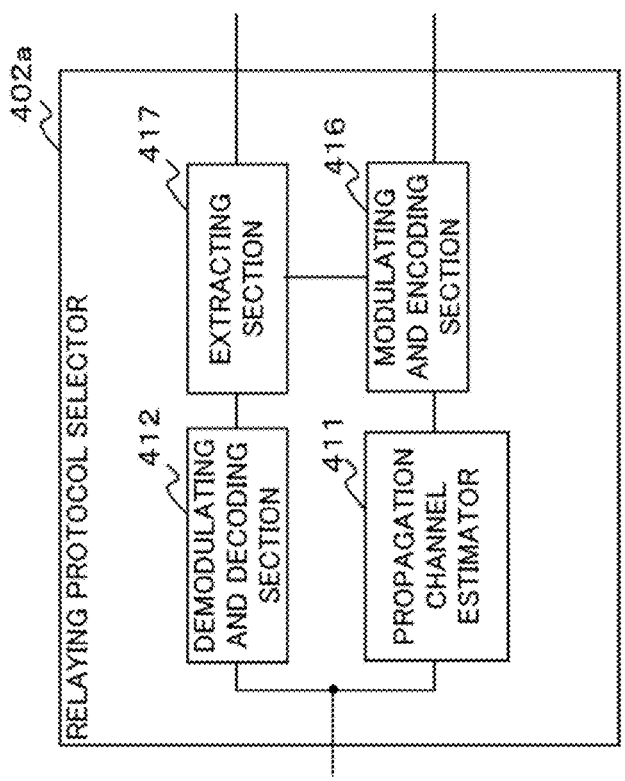
FIG. 11 is a diagram illustrating an example of the configuration of a relaying protocol selector according to the first modification.

FIG. 11 is a diagram illustrating an example of the configuration of the relaying protocol selector 402*a*. The relaying protocol selector 402*a* of FIG. 11 exemplarily includes a propagation channel estimator 411, a demodulating and decoding section 412, an encoding and modulating section 416, and an extracting section 417.

The propagation channel estimator 411 estimates propagation channel information of a section from the base station 200*a* to the relay 400*a* using a known signal, such as a pilot signal that the base station 200*a* transmits.

The encoding and modulating section 416 encodes and modulates the propagation channel information that the propagation channel estimator 411 estimates. The wireless signal containing the propagation channel information processed by the encoding and modulating section 416 is transmitted to the base station 200*a* through the amplifier 405 and the transmitting antenna 406.

The demodulating and decoding section 412 demodulates and decodes the wireless signal that the base station 200*a* transmits. The extracting section 417 extracts information about the selected relaying protocol from a signal output from the demodulating and decoding section 412. The extracted information is also output to the switches 403 and 404.

The demodulating and decoding section 412 and the extracting section 417 extract propagation channel information of a section from the relay 400*a* to the mobile station 300 from the wireless signal that the mobile station 300 transmits. In this case, the propagation channel information of a section from the relay 400*a* to the mobile station 300 is transmitted through the amplifier 405 and the transmitting antenna 406 to the base station 200*a*.

On the basis of the propagation channel information of the section from the base station 200*a* to the relay 400*a* that the propagation channel estimator 411 estimates and the propagation channel information of the section from the relay 400*a* to the mobile station 300 that the extracting section 417 extracts, the base station 200a selects the relaying protocol. In addition, on the basis of the propagation channel information of the section from the base station 200a to the relay 400a, a channel through which a wireless signal is to be transmitted can be selected. Consequently, an optimum channel can be selected, so that the transmission rate can be enhanced.

The above configuration makes the relay 400a possible to switch the relaying protocol in accordance with the relaying protocol that the base station 200a selects by switching a signal path in the relay 400a on the basis of the information of the relaying protocol that the base station 200a selects.

As the above, even if the determination of switching the relaying protocol is made by the base station 200a, the same effects as the first embodiment can be obtained. Also in this case, the relay 400a can have a simpler configuration.

(3) Second Modification:

In place of the relay 400, the mobile station 300 may determine switching of the relaying protocol. In this case, the relay 400 has the same configuration as that of the relay 400a of the first modification.

Figure 12:
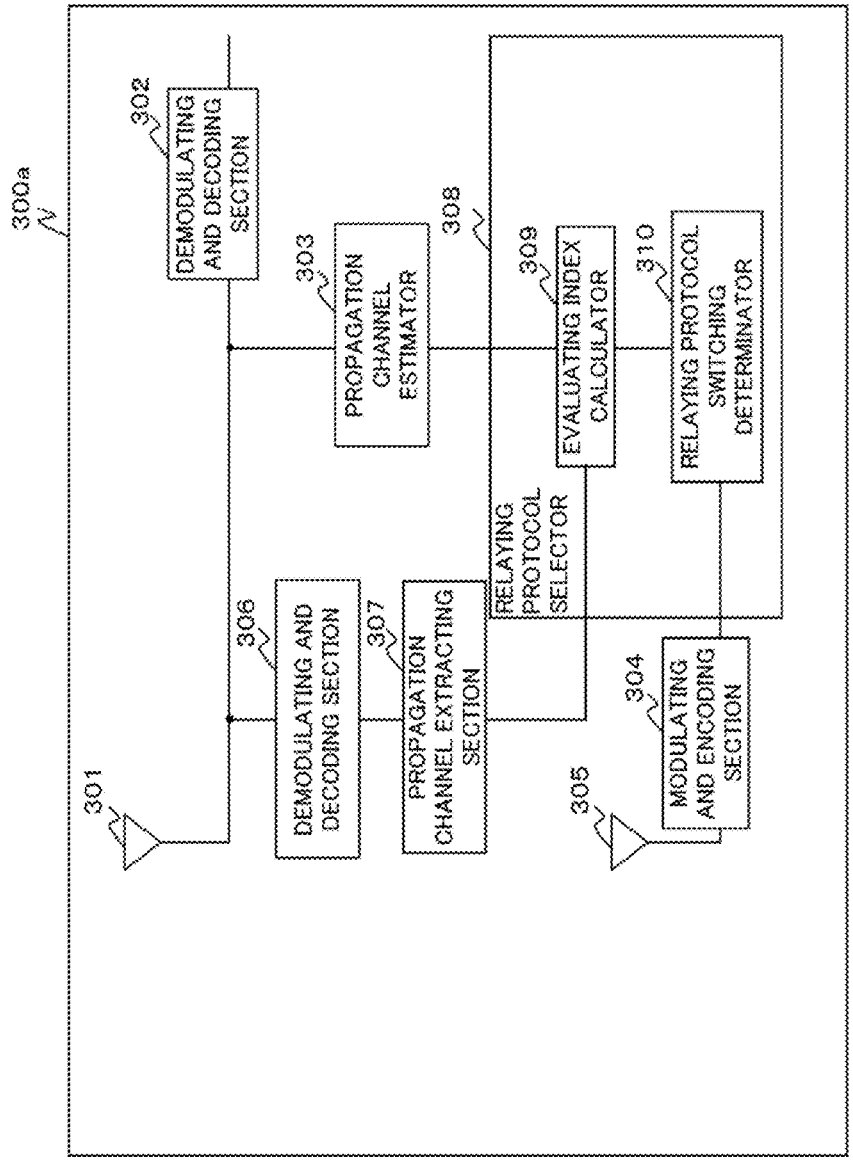
FIG. 12 is a diagram illustrating an example of the configuration of a mobile station according to the first modification.

FIG. 12 is a diagram illustrating an example of the configuration of the mobile station 300a according to a second modification.

The mobile station 300a of FIG. 12 exemplarily includes a receiving antenna 301, a demodulating and decoding section 302, a propagation channel estimator 303, an encoding and modulating section 304, a transmitting antenna 305, a demodulating and decoding section 306, a propagation channel extracting section 307, and a relaying protocol selector 308. Parts and element in FIG. 12 having the same reference numbers as the above represents the same or similar functions, so repetitious description is omitted here.

The demodulating and decoding section 306 demodulates and decodes a wireless signal containing the propagation channel information of the section from the base station 00000200 to the relay 400a that the propagation channel estimator 411 of the relay 400a estimates and that is transmitted through the amplifier 405 and the transmitting antenna 406 of the relay 400a.

The propagation channel extracting section 307 extracts propagation channel information of the section from the base station 200 to the relay 400a from the output of the demodulating and decoding section 306.

The relaying protocol selector 308 selects the relaying protocol that the relay 400a is to adopt on the basis of the propagation channel information of the section from the relay 400a to the mobile station 300a that the propagation channel estimator 303 estimates and the propagation channel information of the section from the base station 200 to the relay 400a that the propagation channel extracting section 307 extracts.

For this purpose, the relaying protocol selector 308 exemplarily includes an evaluating index calculator 309 and a relaying protocol switching determinator 310.

On the basis of two pieces of propagation channel information output from the propagation channel estimator 303 and propagation channel extracting section 307, the evaluating index calculator 309 calculates evaluating values $C_{AF}$ and $C_{DF}$ that are to be used for determination on switching a relaying protocol using the above Formulae (2) and (3). The calculated evaluating values $C_{AF}$ and $C_{DF}$ are output to the relaying protocol switching determinator 310.

On the basis of the evaluating values $C_{AF}$ and $C_{DF}$ calculated by the evaluating index calculator 309 and a predetermined constant A ($0 \leq A < 1$), the relaying protocol switching determinator 310 determines whether the relaying protocol is to be switched. For example, when $C_{AF} > AC_{DF}$, the relaying protocol switching determinator 310 selects the AF protocol while, when $C_{AF} \leq AC_{DF}$, the relaying protocol switching determinator 310 selects the DF protocol.

The information about the relaying protocol that the evaluating index calculator 309 selects is transmitted to the relay 400a through the transmitting antenna 305. The relay 400a switches the relaying protocol according to the received information.

The above configuration makes the mobile station 300a possible to determine whether the relaying protocol that the relay 400a is to adopt is to be switched on the basis of the propagation channel information between the base station 200 and the relay 400a and the propagation channel information between the relay 400a and the mobile station 300a. The information about the switching is notified through the transmitting antenna 305 to the relay 400a. Upon receipt of the information, the relay 400a switches the relaying protocol to one that the mobile station 300a selects.

As the above, even if the determination of switching the relaying protocol is made by the mobile station 300a, the same effects as the first embodiment can be obtained. Also in this case, the relay 400a can have a simpler configuration.

(4) Third Modification:

As described above, relaying via the DF protocol has a large relaying delay.

Generally, the allowable range of a relaying delay is different with a type of data.

For example, voice communication desires a small delay; streaming desires a relatively small delay, which can be however larger than that of voice communication; and data downloading does not desire a delay as small as those that voice communication and streaming desire.

For the above, the constant A used in selection for a relaying protocol may vary with a type that data to be transmitted belongs to as performed in this modification.

Figure 13:
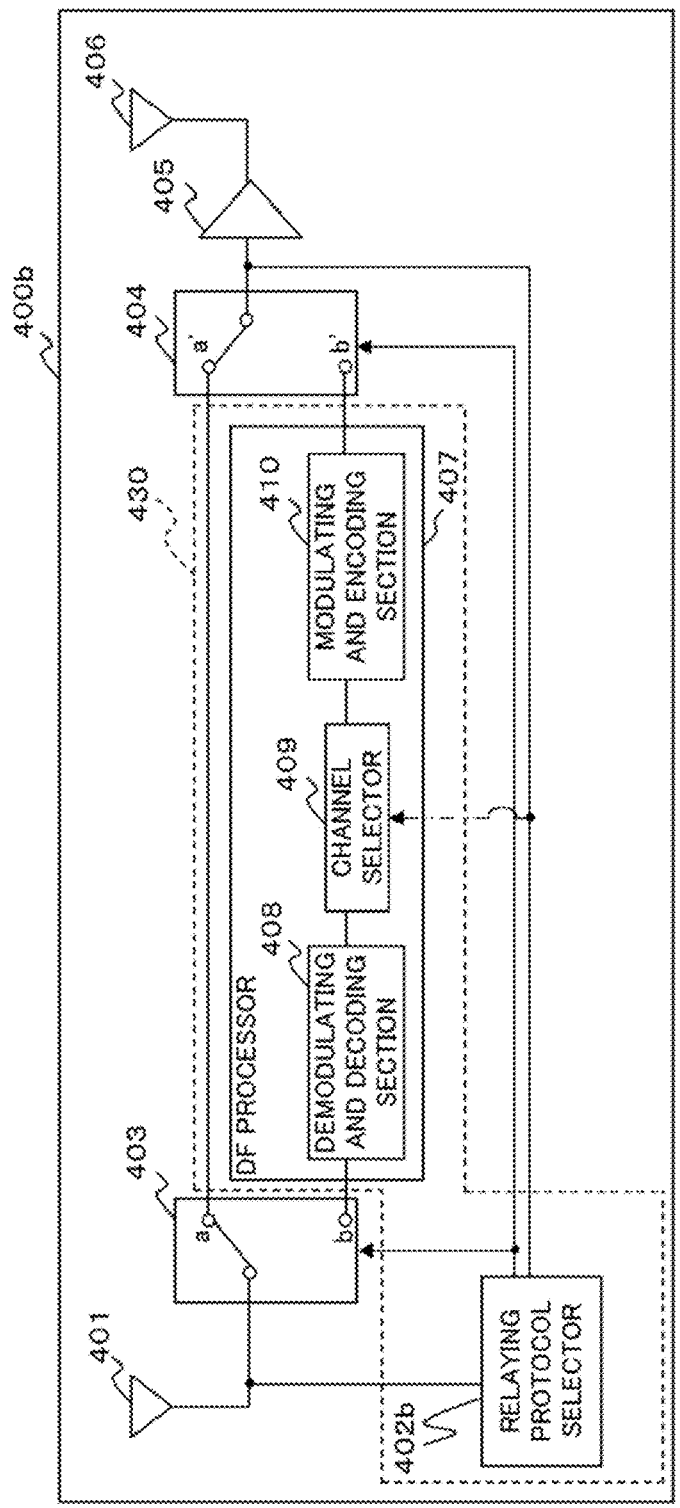
FIG. 13 is a diagram illustrating an example of the configuration of a relay according to a third modification.

FIG. 13 is a diagram illustrating an example of the configuration of a relay 400b according to the third modification.

The relay 400b of FIG. 13 exemplarily includes a receiving antenna 401, switches 403 and 404, an amplifier 405, a transmitting antenna 406, and a digital circuit 430.

The digital circuit 430 exemplarily includes a relaying protocol selector 402b and a DF protocol processor 407. The DF processor 407 exemplarily includes a demodulating and decoding section 408, a channel selector 409, and an encoding and modulating section 410.

The digital circuit 430 is in the form of, for example, an FPGA, an ASIC, or a DSP. The relaying protocol selector 402b and the DF processor 407 may each be in the form of an independent DSP, FPGA, or the like.

Parts and element in FIG. 13 having the same reference numbers as the above represents the same or similar functions, so repetitious description is omitted here.

The relaying protocol selector 402b of FIG. 13 detects the type of data contained in the wireless signal that the base station 200 transmits, and selects one of the AF protocol and the DF protocol to be applied to the wireless signal, on the basis of the result of the detection.

Figure 14:
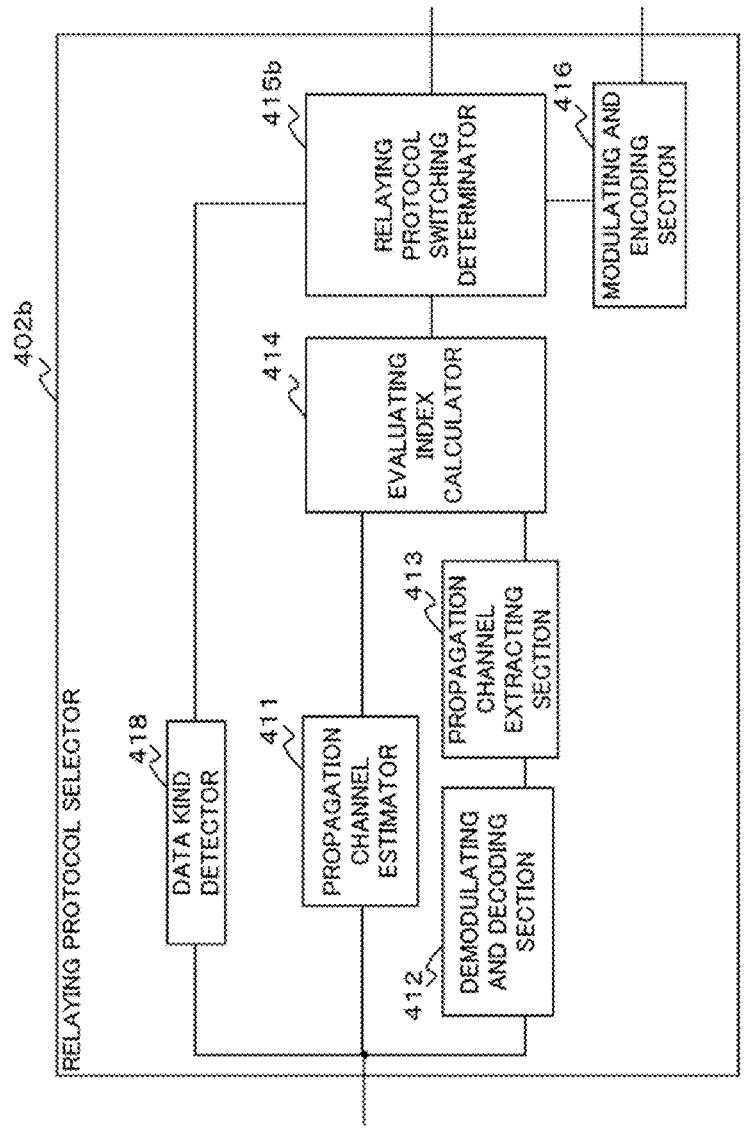
FIG. 14 is a diagram illustrating an example of the configuration of a relaying protocol selector according to the third modification.

FIG. 14 is a diagram illustrating an example of the configuration of the relaying protocol selector 402b.

The relaying protocol selector 402b of FIG. 14 exemplarily includes a propagation channel estimator 411, a demodulating and decoding section 412, a propagation channel extracting section 413, an evaluating index calculator 414, a relaying protocol switching determinator 415b, an encoding and modulating section 416, and a data type detector 418. Parts and element in FIG. 14 having the same reference numbers as the above represents the same or similar functions, so repetitious description is omitted here.

The data type detector 418 detects the type of the data contained in the received wireless signal. For example, the data type detector 418 detects the type of the data in the received wireless signal on the basis of setting information that indicates that a wireless signal containing which type of data is to be transmitted through the respective channels between the base station 200 and the relay 400*b*.

The data type detector 418 may demodulate and decode the received wireless signal, extract data from the processed signal, and detect the type of the extracted data. For example, if the extracted data is a packet having a header and a payload, the data type detector 418 can detect the data type on the basis of the Quality of Service (QoS) information contained in the header.

Information about the data type that the data type detector 418 detects is output to the relaying protocol switching determinator 415*b*.

The relaying protocol switching determinator 415*b* varies the value of the constant A in accordance with input information about the data type. For this purpose, the relaying protocol switching determinator 415*b* prepares a table of FIG. 15 in which a data type and the constant A are associated with each other beforehand, and varies the constant A with reference to the table.

As illustrated in FIG. 15, the constant A is set to be smaller for data less tolerant to a delay so that the AF protocol tends to be selected rather than the DF protocol. An amount of relaying delay can be consequently reduced to satisfy an allowable amount of delay.

On the basis of the evaluating values $C_{AF}$ and $C_{DF}$ that the evaluating index calculator 414 calculates and the above constant A, the relaying protocol switching determinator 415*b* determines whether the relaying protocol is to be switched. For example, when $C_{AF} > AC_{DF}$, the relaying protocol switching determinator 415*b* may select the AF protocol while, when $C_{AF} \leq AC_{DF}$, the relaying protocol switching determinator 415*b* may select the DF protocol.

As the above, the third modification can change the value of the constant A used for selection of the relaying protocol in accordance with the type of the data to be transmitted. With this configuration, it is possible to select an optimum relaying protocol for each data type, so that an allowable amount of delay is satisfied.

Here, the third modification can be applied to the first embodiment and the first and second modifications detailed above.

For example, if the base station 200*a* or the mobile station 300*a* determines switching of the relaying protocol, the base station 200*a* or the mobile station 300*a* may vary the constant A in accordance with the data type A.

(5) Fourth Modification:

The relaying protocol switching determinator 415 controls switching the relaying protocol by applying hysteresis to between switching from the AF protocol to the DF protocol and switching from the DF protocol to the AF protocol. In other words, switching from the DF protocol to the AF protocol can have a threshold value different from that of switching from the AF protocol to DF protocol.

For example, the relaying protocol switching determinator 415 controls the switching the relaying protocol in the following manner using the evaluating values obtained from the above Formulae (2) and (3) and another constants D ($0 \leq D < 1$) and E ($0 \leq E < 1$, $D > E$).

When the condition $C_{AF} > DC_{DF}$ is satisfied, the relaying protocol switching determinator 415 switches from the DF protocol to AF protocol while, when the condition $C_{AF} < EC_{DF}$ is satisfied, the relaying protocol switching determinator 415 switches from the AF protocol to the DF protocol. Furthermore, the relaying protocol switching is not applied in the cases other than the above.

Namely, when the evaluating value $C_{AF}$ comes to be larger than $DC_{DF}$, the DF protocol is switched to the AF protocol. However, even when the evaluating value $C_{AF}$ comes to be $DC_{DF}$ or less, the AF protocol is not switched to the DF protocol unless the evaluating value $C_{AF}$ comes to be smaller than $EC_{DF}$.

Besides, when the evaluating value $C_{AF}$ comes to be smaller than $EC_{DF}$, the AF protocol is switched to the DF protocol. However, even when the evaluating value $C_{AF}$ comes to be $EC_{DF}$ or larger, the DF protocol is not switched to the AF protocol unless the evaluating value $C_{AF}$ comes to be larger than $DC_{DF}$.

Similarly to the constant A, the values of the constants D and E can be determined on the basis of an amount delay when the DF protocol is adopted. Considering practical superiority of the AF protocol to the DF protocol, such as a simpler circuit configuration and a smaller consumption power, the constants D and E may be set further smaller.

As the above, even under a state where the transmission environment momentarily changes, controlling switching to the relaying protocol by applying hysteresis to between switching from the AF protocol to the DF protocol and switching from the DF protocol to the AF protocol can prevent the relaying protocol from frequently switching one after another.

The fifth modification can be applied to the first embodiment and the foregoing modifications.

For example, the base station 200*a* or the mobile station 300*a* determines switching of the relaying protocol, the base station 200*a* or the mobile station 300*a* can control switching of the relaying protocol by applying hysteresis to between switching from the AF protocol to the DF protocol and switching from the DF protocol to the AF protocol.

Also when the relaying protocol is switched considering each data type, hysteresis may be applied to between switching from the AF protocol to the DF protocol and switching from the DF protocol to the AF protocol.

(6) Fifth Modification:

For example, when the wireless communication system has a number of mobile stations, the optimum relaying method for one mobile station is not always the optimum relaying protocol for another mobile station because the mobile stations have different transmission environment due to the positions of the respective mobile stations.

For the above, the relay 400 may vary the relaying protocol for signal to be transmitted to each mobile station, and additionally may be carry out relaying via different protocols in parallel.

For simplification, the number of signals, the number of channels between the base station and the relay, and the number of channels between the relay and each mobile station are assumed to N (an integer of two or more).

Figure 16:
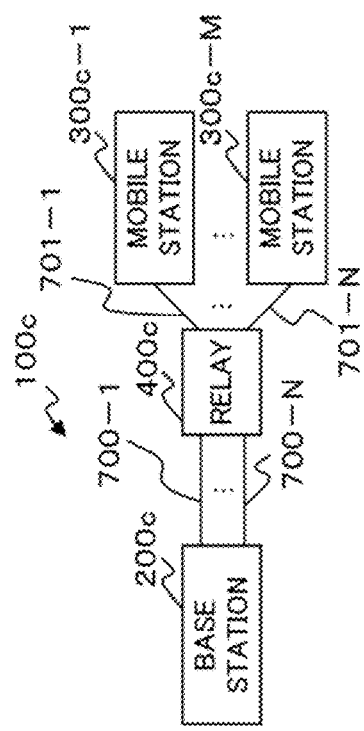
FIG. 16 is a diagram illustrating an example of the configuration of a wireless communication system according to a fifth modification.

FIG. 16 is a diagram illustrating an example of the configuration of a wireless communication system 100*c* according to the fifth modification.

The wireless communication system 100*c* of FIG. 16 exemplarily includes a base station 200*c*, M mobile stations 300*c*-1, . . . , 300*c*-M (where, M is an integer of two or more, MN), and a relay 400*b*. When there is no need to discriminate the mobile stations 300*c*-1, . . . , 300*c*-M from one another, each mobile station is represented by the reference number 300*c*.

The wireless communication system 100c of FIG. 16 includes N channels 700-1, . . . , 700-N between the base station 200c and the relay 400c, and N channels 701-1, . . . , 701-N between the relay 400c and the mobile stations 300c.

The difference of the number M of mobile stations from the number N of signals suggests the possibility of allocating two or more channels to a single mobile station.

Figure 17:
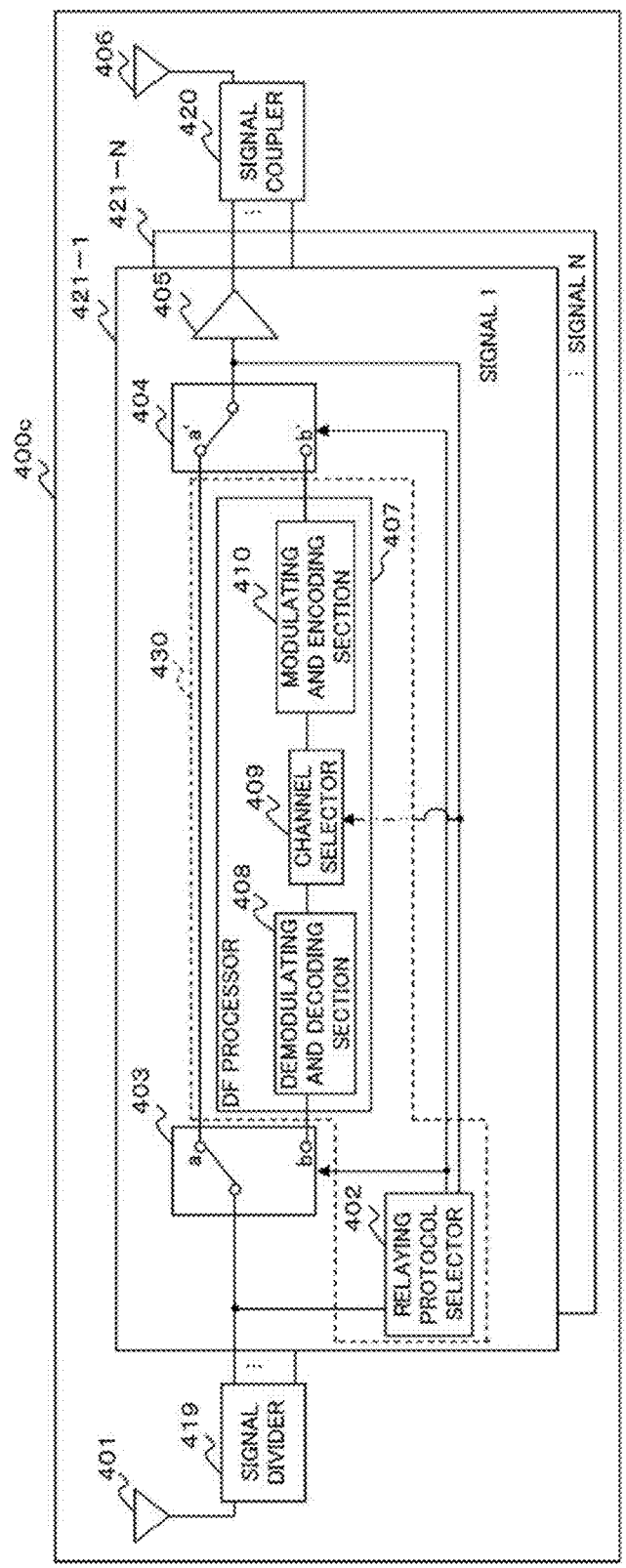
FIG. 17 is a diagram illustrating an example of the configuration of a relay according to a fifth modification.

FIG. 17 is a diagram illustrating an example of the configuration of the relay 400c of the fifth modification.

The relay 400c of FIG. 17 exemplarily includes a receiving antenna 401, a transmitting antenna 406, a signal divider 419, a signal coupler 420, and first relay processor 421-1 through N-th relay processor 421-N. The first relay processor 421-1 through N-th relay processor 421-N each exemplarily include switches 403 and 404, an amplifier 405, and a digital circuit 430. Each digital circuit 430 exemplarily includes a relaying protocol selector 402 and a DF processor 407. The DF processor 407 exemplarily includes a demodulating and decoding section 408, a channel selector 409, and an encoding and modulating section 410.

The digital circuit 430 is in the form of, for example, an FPGA, an ASIC, or a DSP. The relaying protocol selector 402 and the DF processor 407 may each be in the form of an independent DSP, FPGA, or the like.

Parts and element in FIG. 17 having the same reference numbers as the above represents the same or similar functions, so repetitious description is omitted here.

The signal divider 419 of FIG. 17 divides N wireless signals that the base station 200c transmits through the channels 700-1 through 700-N and that the receiving antenna 401 receives into each individual signal. If the N wireless signals have different frequency, the signal divider 419 can use a filtering circuit to divide the signals. The wireless signals that the signal divider 419 divides may be allocated one to each of the mobile stations 300c, or two or more of the divided wireless signals may be allocated to one of the mobile stations 300c.

The N signals that the signal divider 419 divides are each input into one of the first relay processor 421-1 through the N-th relay processor 421-N to undergo relaying processing independently of one other. The signals independently undergo relaying processing in the first relay processor 421-1 through the N-th relay processor 421-N are then output to the signal coupler 420.

The signal coupler 420 combines the signals output from the first relay processor 421-1 through the N-th relay processor 421-N and outputs the combined signal to the transmitting antenna 406.

The transmitting antenna 406 transmits the signal to the base station 200c or the mobile stations 300c.

The relaying protocol selector 402 of the first demodulating and decoding section 421-1 outputs propagation channel information of the channel 700-1 between the base station 200c and the relay 400c and propagation channel information of the channel 701-1 between the relay 400c and the mobile station 300c-1.

Similarly, the relaying protocol selector 402 of the N-th demodulating and decoding section 421-N outputs propagation channel information of the channel 700-N between the base station 200c and the relay 400c and propagation channel information of the channel 701-N between the relay 400c and the mobile station 300c-N.

The two pieces of propagation path information are transmitted to the base station 200c through the amplifier 405, the signal coupler 420, and transmitting antenna 406.

The above configuration makes the relay 400c possible to divide the received wireless signal into signals destined for the respective mobile stations 300c, perform relaying processing on the divided signals independently of one another, switch the relaying protocol for each signal to be transmitted, and further perform the relaying processing on the divided signals in parallel. Thereby, it is possible to select the optimum relaying protocol for each mobile stations 300c, so that the transmission rate of communication with each mobile station 300c can be optimized.

Figure 18:
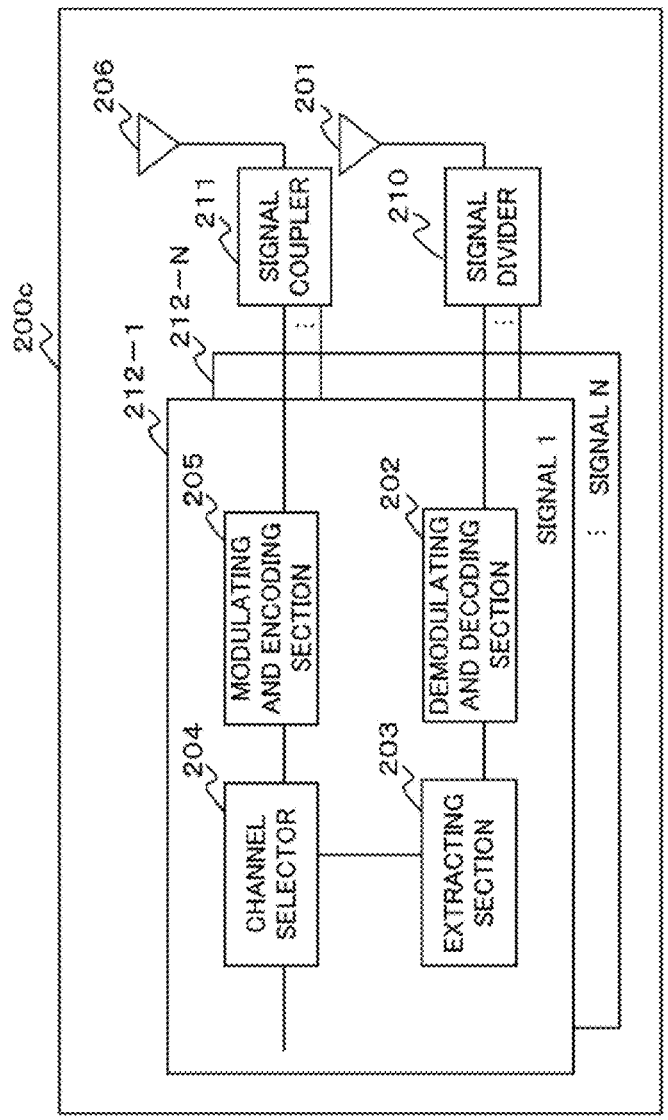
FIG. 18 is a diagram illustrating an example of the configuration of a base station according to the fifth modification.

FIG. 18 is a diagram illustrating an example of the configuration of the base station 200c of the fifth modification.

The base station 200c of FIG. 18 exemplarily includes a receiving antenna 201, a transmitting antenna 206, a signal divider 210, a signal coupler 211, and first transmitting processor 212-1 through N-th transmitting processor 212-N. The first transmitting processor 212-1 through N-th transmitting processor 212-N each exemplarily include a demodulating and decoding section 202, a extracting section 203, a channel selector 204, and an encoding and modulating section 205.

Parts and element in FIG. 18 having the same reference numbers as the above represents the same or similar functions, so repetitious description is omitted here.

The signal divider 210 of FIG. 18 divides a wireless signal that the relay 400c transmits and that contains propagation channel information of a section between the base station 200c to the relay 400c, propagation channel information of a section between the relay 400c and the mobile stations 300c, and the relaying protocol selected by the relaying protocol selector 402 into the respective signals. The divided wireless signals are used one in each of the first transmitting processor 212-1 through N-th transmitting processor 212-N. The wireless signal output from the first relay processor 421-1 is used in the first transmitting processor 212-1; and similarly, the wireless signal output from the N-th relay processor 421-N is used in the N-th transmitting processor 212-N.

The first transmitting processor 212-1 through the transmitting processor 212-N select a channel for each signal to be transmitted and encode and demodulate the signal.

The signal coupler 211 combines signals each processed in one of the first transmitting processor 212-1 through N-th transmitting processor 212-N and outputs the combined signal to the transmitting antenna 206.

With the above configuration, an optimum channel to be used for transmitting a wireless signal can be selected by selecting a channel for each mobile stations 300c.

Each mobile station 300c of the fifth embodiment is the same in configuration as that of the mobile station 300 of the first embodiment.

As the above, switching the relaying protocol for each signal to be transmitted makes it possible to select the optimum relaying protocol even if the relay relays wireless signals destined for two or more mobile stations.

The fifth modification also can be applied to at least one of the first embodiment and the foregoing modifications.

For example, determination of switching the relaying protocol may be made by the base station 200c or by each mobile station 300c.

The relaying protocols for respective signals to be transmitted to two or more mobile stations 300c may be independently switched in accordance with the data type.

Furthermore, for the respective signals to be transmitted to two or more mobile stations 300c, hysteresis may be applied to between switching from the AF protocol to the DF protocol and switching from the DF protocol to the AF protocol.

(7) Sixth Modification:

The above first embodiment and modifications assume that the relaying protocol is switched on the basis of propagation channel information in the direction of from the base station to the mobile station. Alternatively, the relaying protocol may be switched also on the basis of propagation channel information in the direction (i.e., the feedback channel) of from the mobile station to the base station.

In this case, in addition to the relay 400 and the mobile station 300, the base station 200 has a function of estimating propagation channel information. The base station 200 of the sixth modification further has functions of estimating propagation channel information of the section from the relay 400 to the mobile station 300 using a known signal such as a pilot signal that the relay 400 transmits and transmitting the estimated propagation channel information to the relay 400. Still further, the relay 400 has a function of estimating propagation channel information of the section from the mobile station 300 to the relay 400 using a known signal such as a pilot signal that the mobile station 300 transmits.

Specifically, the evaluating index calculator 414 calculates evaluating values $C_{AF}'$ and $C_{DF}'$ related to the AF protocol and the DF protocol using the following Formulae (6) and (7) as substitutes for the above Formulae (2) and (3).

$$C_{AF}=\text{Min}(C(\alpha_{11}),C(\beta_{11}))+\text{Min}(C(\alpha_{21}),C(\beta_{21}))+F\times(\text{Min}(C(\alpha_{12}),C(\beta_{12}))+\text{Min}(C(\alpha_{22}),C(\beta_{22}))) \quad (6)$$

$$C_{DF}=\text{Min}(C(\alpha_{11})+C(\alpha_{21})+F\times(C(\alpha_{12})+C(\alpha_{22})),C(\beta_{11})+C(\beta_{21})+F\times(C(\beta_{12})+C(\beta_{22}))) \quad (7)$$

In the above Formulae, the terms $\alpha_{11}$ and $\alpha_{21}$ represent first and second channel coefficients of a propagation channel from the base station 200 to the relay 400; and the terms $\beta_{11}$ and $\beta_{21}$ represent first and second channel coefficients of a propagation channel from the relay 400 to the mobile station 300.

The terms $\alpha_{12}$ and $\alpha_{22}$ represent first and second feedback channel coefficients of a propagation channel from the relay 400 to the base station 200; and the terms $\beta_{11}$ and $\beta_{21}$ represent first and second feedback channel coefficients of a propagation channel from the mobile station 300 to the relay 400.

The term F is an arbitrary constant of zero or more. The constant F set to be smaller than 1 can reduce the influence of the feedback channels on the respective evaluating values.

The switching of the relaying protocol in consideration of propagation channel information of the feedback channel makes it possible to select the optimum relaying protocol on the basis of feedback such as ACK/NACK.

Alternatively, the evaluating index calculator 414 may calculate the evaluating index using both propagation channel information of the direction of the base station 200 to the mobile station 300 and propagation channel information the direction of the mobile station 300 to the base station 200.

The sixth embodiment can be applied to the first embodiment and the foregoing modifications.

For example, if the base station 200a or the mobile station 300a makes determination of switching a relaying protocol, the base station 200a or the mobile station 300a may switch the relaying protocol, considering propagation channel information of the feedback channel.

If the relaying protocol is switched in accordance with the data type, the relaying protocol may be switched in consideration of the propagation channel information of the feedback channel.

Furthermore, when the relaying protocol may be switched in considering the propagation channel information of the feedback channel, hysteresis may be applied to between switching from the AF protocol to DE protocol and switching from the DF protocol to AF protocol.

(8) Others:

The functions and the configurations of the base station 200, the mobile station 300, and the relay 400 described above may be selected, discarded, or combined according to the purpose. In other words, the above configurations and functions may be selected, discarded, or combined to realize the function of the embodiment and the modifications thereof.

Alternatively, if the DF protocol is adopted in the above embodiment and modifications, the relay determines allocation of a wireless signal to a channel and notifies the information of the allocation to the remaining devices. Data is allocated to the channel i between the base station 200 and the relay 400 and the channel i between the relay 400 to the mobile station 300 according to, for example, the following formulae (8) and (9).

$$C_{DF}\times C(\alpha_i)/(C(\alpha_1)+C(\alpha_2)) \quad (8)$$

$$C_{DF}\times C(\beta_i)/(C(\beta_1)+C(\beta_2)) \quad (9)$$

In replace of the relay 400, the base station 200 or the mobile station 300 may determine allocation to a wireless signal to a channel.

Furthermore, the configurations of the first embodiment and the modifications can have multistage relays 400. In this case, the evaluating values $C_{AF}$ and $C_{DF}$ are calculated using, for example, the following Formulae (10) and (11).

$$C_{AF} = \sum_{i=1}^{r} \text{Min}(C(\alpha_i^1), C(\alpha_i^2), \ldots, C(\alpha_i^{n_i})) \quad (10)$$

$$C_{DF} = \text{Min}\left(\sum_{j=1}^{n_1} C(\alpha_1^j), \sum_{j=1}^{n_2} C(\alpha_2^j), \ldots, \sum_{j=1}^{n_r} C(\alpha_r^j)\right) \quad (11)$$

In the formulae, the term "r" represents the number of relaying sections; the term "$n_i$" represents the number of channels in the i-th section; the term "$\alpha_i^j$" is a channel coefficient of the j-th channel in the i-th section between two relays in the direction of from the base station 200 to the mobile station 300.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A relay device that relays a wireless signal between a transmission device and a reception device, comprising:
   a receiver that receives the wireless signal from the transmission device;
   a transmitter that transmits, to the reception device, the received wireless signal subjected to processing via a first protocol that amplifies the received wireless signal or a second protocol that decodes and re-encodes data contained in the received wireless signal;
   and a controller that switches between the first protocol and the second protocol using an evaluating index including a first evaluating value related to a state of a transmission path between the transmission device and the relay device and a second evaluating value related to a state of a transmission path between the relay device and the reception device, wherein the first evaluating value is estimated by the relay device and is based on a monitoring result of a signal transmitted from the transmission device, and the second evaluating value is estimated by the reception device and is based on a result of monitoring a signal transmitted from the relay device to the reception device, the second evaluating value being received by the relay device;

wherein the controller switches from the first protocol to the second protocol using a first threshold of the evaluating index, and switches from the second protocol to the first protocol using a second threshold of the evaluating index, the first threshold and the second threshold being different from each other;

wherein the first protocol is Amplify-and-Forward (AF) protocol and the second protocol is Decode-and-Forward (DF) protocol.

2. The relay device according to claim 1, wherein the evaluating index further includes a third evaluating value related to a relaying delay time in the relay device when the first protocol is adopted and a fourth evaluating value related to a relaying delay time in the relay device when the second protocol is adopted.

3. The relay device according to claim 1, wherein the evaluating index further includes a fifth evaluating value related to a type of the data.

4. The relay device according to claim 1, wherein:
the transmitter transmits a plurality of the wireless signals after being subjected to the processing via the first protocol or the second protocol to a plurality of the reception devices; and
the controller controls switching between the first protocol and the second protocol to be adopted to each of the plurality of wireless signals to be transmitted corresponding one of the plurality of reception devices.

5. A method for relaying a wireless signal between a transmission device and a reception device via a relay device, comprising:
switching between a first protocol that amplifies the wireless signal or a second protocol that decodes and re-encodes data contained in the wireless signal to the reception device using an evaluating index including a first evaluating value related to a state of a transmission path between the transmission device and the relay device and a second evaluating value related to a state of a transmission path between the relay device and the reception device;
and transmitting the wireless signal, which is received from the transmission device and which is subjected to processing via a protocol determined in the switching to the reception device,
wherein the first evaluating value is estimated by the relay device and is based on monitoring result of a signal transmitted from the transmission device,
and the second evaluating value is estimated by the reception device and is based on a result of monitoring a signal transmitted from the relay device to the reception device, the second evaluating value being received by the relay device;
wherein the switching switches from the first protocol to the second protocol using a first threshold of the evaluating index, and switches from the second protocol to the first protocol using a second threshold of the evaluating index, the first threshold and the second threshold being different from each other;

wherein the first protocol is Amplify-and-Forward (AF) protocol and the second protocol is Decode-and-Forward (DF) protocol.

6. The method according to claim 5, wherein the evaluating index further includes a third evaluating value related to a relaying delay time in the relay device when the first protocol is adopted and a fourth evaluating value related to a relaying delay time in the relay device when the second protocol is adopted.

7. The method according to claim 5, wherein the evaluating index further includes a fifth evaluating value related to a type of the data.

8. The method according to claim 5, wherein:
the relay device transmits a plurality of the wireless signals to a plurality of the reception devices;
the method further comprises switching between the first protocol and the second protocol to be adopted to each of the plurality of wireless signals to be transmitted corresponding one of the plurality of reception devices, and transmitting the wireless signal, which is received from the transmission device and which is subjected to processing via a protocol determined in the switching, to the corresponding reception device.

9. A wireless communication system including a transmission device that transmits a wireless signal, a reception device that receives the wireless signal, and a relay device that relays the wireless signal transmitted and received between the transmission device and the reception device, the relay device comprising:
a receiver that receives the wireless signal from the transmission device;
a transmitter that transmits, to the reception device, the received wireless signal subjected to processing via a first protocol that amplifies the received wireless signal or a second protocol that decodes and re-encodes data contained in the received wireless signal; and
a controller that switches between the first protocol and the second protocol using an evaluating index including a first evaluating value related to a state of a transmission path between the transmission device and the relay device and a second evaluating value related to a state of a transmission path between the relay device and the reception device,
wherein the first evaluating value is estimated by the relay device and is based on a monitoring result of a signal transmitted from the transmission device, and
the second evaluating value is estimated by the reception device and is based on a result of monitoring a signal transmitted from the relay device to the reception device, the second evaluating value being received by the relay device;
wherein the controller switches from the first protocol to the second protocol using a first threshold of the evaluating index, and switches from the second protocol to the first protocol using a second threshold of the evaluating index, the first threshold and the second threshold being different from each other;
wherein the first protocol is Amplify-and-Forward (AF) protocol and the second protocol is Decode-and-Forward (DF) protocol.

10. The wireless communication system according to claim 9, wherein the evaluating index further includes a third evaluating value related to a relaying delay time in the relay device when the first protocol is adopted and a fourth evaluating value related to a relaying delay time in the relay device when the second protocol is adopted.

11. The wireless communication system according to claim 9, wherein the evaluating index further includes a fifth evaluating value related to a type of the data.

12. The wireless communication system according to claim 9, wherein:
- the transmitter transmits a plurality of the wireless signals after being subjected to the processing via the first protocol or the second protocol to a plurality of the reception devices; and
- the controller controls switching between the first protocol and the second protocol to be adopted to each of the plurality of wireless signals to be transmitted corresponding one of the plurality of reception devices.

* * * * *